US012761682B2

(12) United States Patent
Xiao et al.

(10) Patent No.: US 12,761,682 B2
(45) **Date of Patent: *Oct. 13, 2026**

(54) BANDGAP CURRENT REFERENCE

(71) Applicant: TEXAS INSTRUMENTS INCORPORATED, Dallas, TX (US)

(72) Inventors: Boqiang Xiao, Tucson, AZ (US); Avinash Shreepathi Bhat, Tucson, AZ (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/209,526

(22) Filed: Jun. 14, 2023

(65) Prior Publication Data

US 2023/0324941 A1 Oct. 12, 2023

Related U.S. Application Data

(63) Continuation of application No. 17/853,358, filed on Jun. 29, 2022, now Pat. No. 11,714,444.

(60) Provisional application No. 63/257,053, filed on Oct. 18, 2021.

(51) Int. Cl.
*G05F 3/30* (2006.01)
*G05F 3/22* (2006.01)

(52) U.S. Cl.
CPC . *G05F 3/22* (2013.01); *G05F 3/30* (2013.01)

(58) Field of Classification Search
None
See application file for complete search history.

(56) References Cited

U.S. PATENT DOCUMENTS 4,059,793 A * 11/1977 Ahmed ..................... G05F 3/30 327/535
4,446,419 A 5/1984 van de Plassche
4,785,231 A 11/1988 Bohme
4,914,400 A * 4/1990 Kobayashi .......... H03F 3/45076 330/252
5,200,637 A * 4/1993 Matsuo ............... H01L 29/4238 257/E29.136
5,352,973 A 10/1994 Audy
5,790,060 A * 8/1998 Tesch .................... H03M 1/089 341/145
5,920,184 A * 7/1999 Kadanka ................. G05F 3/245 323/907
6,121,824 A * 9/2000 Opris ........................ G05F 3/30 327/539
6,137,363 A * 10/2000 Miki ..................... H03F 3/3027 330/257
6,198,266 B1 3/2001 Mercer
(Continued)

*Primary Examiner* — Thomas J. Hiltunen
(74) *Attorney, Agent, or Firm* — Charles F. Koch

(57) ABSTRACT

A bandgap current reference circuit includes a bandgap core circuit and an error amplifier. The bandgap core circuit is configured to generate a zero temperature coefficient bandgap current. The bandgap core circuit includes a bipolar transistor. The bipolar transistor is configured to pass a current that is proportional to absolute temperature (PTAT current). The error amplifier is coupled to the bandgap core circuit and includes a bipolar differential input pair. The bipolar differential input pair is configured to ensure that the PTAT current is flowing in the bipolar transistor.

23 Claims, 6 Drawing Sheets

(56) References Cited

U.S. PATENT DOCUMENTS

| | | | | |
|---|---|---|---|---|
| 6,255,807 | B1 * | 7/2001 | Doorenbos | G05F 3/30 323/907 |
| 6,384,586 | B1 * | 5/2002 | Sugawara | G05F 3/225 323/316 |
| 6,489,835 | B1 | 12/2002 | Yu | |
| 6,771,055 | B1 * | 8/2004 | Bell | G05F 3/30 327/539 |
| 6,822,513 | B1 * | 11/2004 | Li | H03F 3/45219 330/261 |
| 7,288,925 | B2 | 10/2007 | Nagata | |
| 7,420,359 | B1 * | 9/2008 | Anderson | G05F 3/30 327/535 |
| 7,893,681 | B2 | 2/2011 | Arai | |
| 8,384,031 | B2 | 2/2013 | Rueger | |
| 8,400,213 | B2 | 3/2013 | Sicard | |
| 8,493,130 | B2 * | 7/2013 | Fukazawa | G05F 1/567 327/539 |
| 8,536,855 | B2 * | 9/2013 | Yen Mai | G05F 1/613 323/317 |
| 8,866,539 | B2 * | 10/2014 | Sano | G05F 3/267 327/539 |
| 9,564,805 | B2 | 2/2017 | Sano | |
| 10,809,752 | B2 * | 10/2020 | Hurwitz | G05F 3/30 |
| 11,029,718 | B2 * | 6/2021 | Eberlein | G05F 3/267 |
| 11,714,444 | B2 * | 8/2023 | Xiao | G05F 3/22 327/539 |
| 2009/0039949 | A1 * | 2/2009 | Pietrobon | G05F 3/30 327/539 |

* cited by examiner

BANDGAP CURRENT REFERENCE

CROSS-REFERENCE TO RELATED APPLICATIONS

This application is a continuation of U.S. application Ser. No. 17/853,358 filed Jun. 29, 2022, which claims priority to U.S. Provisional Application No. 63/257,053, filed Oct. 18, 2021, entitled "Area and Current Efficient High PSR Bandgap Current Reference," which is hereby incorporated by reference.

BACKGROUND

Many circuits and devices (e.g., linear or switching voltage regulators), need a precise reference voltage to operate. A bandgap reference circuit may be used to generate such a reference voltage. Bandgap voltage reference circuits generate a temperature-stable voltage by combining a p-n junction voltage with a thermal voltage. A bandgap reference circuit generates a complementary-to-absolute-temperature (CTAT) voltage/current and a proportional-to-absolute-temperature (PTAT) voltage/current. The CTAT component decreases with increasing temperature (i.e., the CTAT component has a negative temperature coefficient), and the PTAT component increases with increasing temperature (i.e., the PTAT component has a positive temperature coefficient). The bandgap reference circuit combines the PTAT and CTAT voltages or currents such that their respective temperature coefficients cancel each other out to produce a temperature stable voltage or current.

SUMMARY

In one example, a bandgap current reference circuit includes a bandgap core circuit and an error amplifier. The bandgap core circuit includes a first bipolar transistor, a first resistor, and a second resistor. The first bipolar transistor includes an emitter, a collector, and base. The first resistor is coupled between the emitter and the base. The second resistor is coupled between the collector and the base. The error amplifier includes a differential input stage and a gain stage. The differential input stage is coupled to the bandgap core circuit. The differential input stage includes a second bipolar transistor and a third bipolar transistor. The second bipolar transistor has an emitter. The third bipolar transistor has an emitter that is larger than the emitter of the second bipolar transistor. The emitter of the third bipolar transistor is coupled to the emitter of the second bipolar transistor. The gain stage includes a first input, a second input, and an output. The first input is coupled to the differential input stage. The second input is coupled to the differential input stage. The output is coupled to the bandgap core circuit.

In another example, a bandgap current reference circuit includes a bandgap core circuit and an error amplifier. The bandgap core circuit includes a first bipolar transistor and a second bipolar transistor. The first bipolar transistor includes an emitter, a collector, and abase. The base is coupled to the collector. The second bipolar transistor includes an emitter, a collector, and a base. The emitter of the second bipolar transistor is coupled to the emitter of the fist bipolar transistor. The base of the second bipolar transistor is coupled to the collector of the first bipolar transistor. The error amplifier includes a first input, a second input, and an output. The first input is coupled to the collector of the first bipolar transistor.

The second input is coupled to the collector of the second bipolar transistor. The output is coupled to the bandgap core circuit.

In a further example, a bandgap current reference circuit includes a bandgap core circuit and an error amplifier. The bandgap core circuit is configured to generate a zero temperature coefficient bandgap current, and includes a bipolar transistor. The bipolar transistor is configured to pass a current that is proportional to absolute temperature (PTAT current). The error amplifier is coupled to the bandgap core circuit and includes a bipolar differential input pair. The bipolar differential input pair is configured to ensure that the PTAT current is flowing in the bipolar transistor.

In another example, a data acquisition system includes an analog-to-digital converter (ADC) and a voltage regulator. The voltage regulator is coupled to the ADC. The voltage regulator includes a bandgap core circuit and an error amplifier. The bandgap core circuit is configured to generate a zero temperature coefficient bandgap current. The bandgap core circuit includes a bipolar transistor configured to pass a current that is proportional to absolute temperature (PTAT current). The error amplifier is coupled to the bandgap core circuit and includes a bipolar differential input pair configured to ensure that the PTAT current is flowing in the bipolar transistor.

DETAILED DESCRIPTION

Circuit area and power supply rejection are important parameters in low-dropout voltage regulators (LDO). A small LDO with good power supply rejection can be produced using a unity gain LDO referenced by a zero temperature coefficient (ZTC) current onto a resistor (e.g., an external resistor). Unity gain improves power supply rejection at output voltages greater than a bandgap voltage, where a scaled up reference can benefit from the output filter capacitor, and no feedback resistive divider is needed at the output of the LDO.

Because the resistance of the external resistor can vary, accuracy of the reference current flowing in the resistor is desirable. A ZTC reference current can be generated using a bandgap voltage circuit coupled to a voltage-to-current converter, or using a bandgap current circuit. A bandgap voltage circuit with a voltage-to-current converter includes multiple amplifiers, which increase circuit area and current consumption. In the voltage-to-current converter, process variation of the $$\frac{V_{BG}}{R}$$

resistance causes variation in the current output. Direct generation of bandgap current (without voltage-to-current conversion) avoids these issues. However, circuits that directly generate bandgap current are subject to multiple stable operating points, which is undesirable. The bandgap current reference circuits described herein operate at a single stable operating point, and reduce circuit area relative to other direct bandgap current circuits. The described bandgap current reference circuits also reduce variation in reference current over process, temperature, and voltage, and due to component mismatch, which reduces trim requirements and associated cost.

Figure 1:
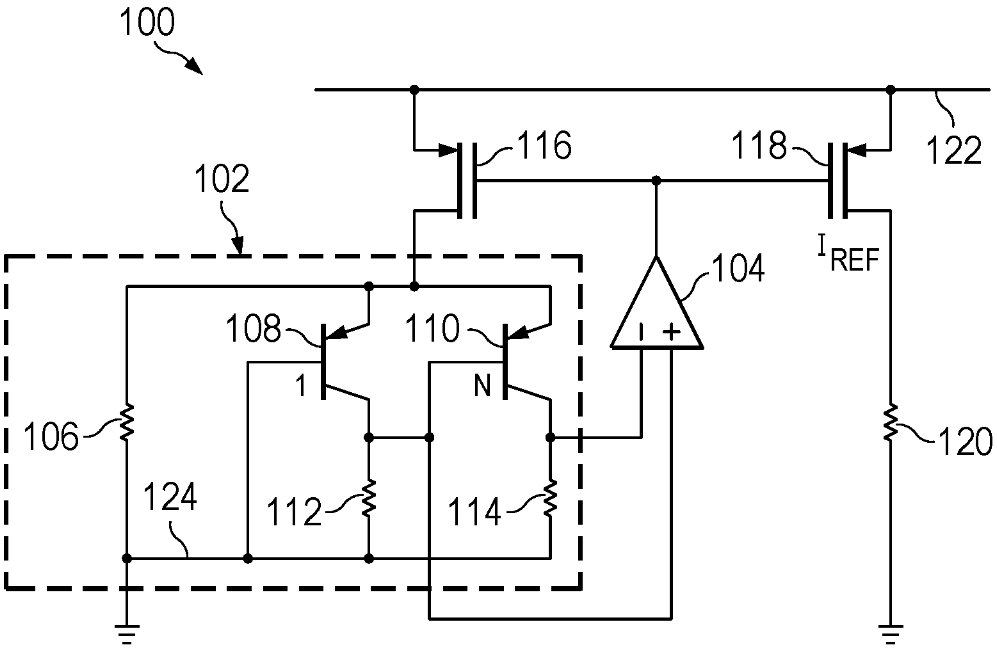
FIG. 1 is a schematic level diagram of an example bandgap current reference circuit.

FIG. 1 is a schematic level diagram of an example bandgap current reference circuit 100. The bandgap current reference circuit 100 includes a bandgap core circuit 102, an error amplifier 104, a resistor 120, a current source 116, and a current source 118. The bandgap core circuit 102 includes a bipolar transistor 108, a bipolar transistor 110, a resistor 106, a resistor 112, and a resistor 114. The bipolar transistor 108 and the bipolar transistor 110 may be PNP bipolar transistors. An emitter of the bipolar transistor 108 is coupled to an emitter of the current source 116, and to a first terminal of the resistor 106. Current provided by the current source 116 flows through the resistor 106, the bipolar transistor 108, and the bipolar transistor 110. The current flowing through the bipolar transistor 108 and the bipolar transistor 110 is proportional to absolute temperature (PTAT), the current flowing through the resistor 106 is complementary to absolute temperature (CTAT). Thus, the bandgap core circuit 102 includes two PTAT legs and one CTAT leg, which reduces circuit area and mismatch variation relative to bandgap current reference circuits that implement multiple CTAT legs.

A base of the bipolar transistor 108 is coupled to a ground terminal 124, and collector of the bipolar transistor 108 is coupled to the ground terminal 124 via the resistor 112. A base of the bipolar transistor 110 is coupled to the collector of the bipolar transistor 108, and the collector of the bipolar transistor 110 is coupled to the ground terminal 124 via the resistor 114. The bipolar transistor 110 is N times larger than the bipolar transistor 108 (e.g., the emitter of the bipolar transistor 110 is N times larger than the emitter of the bipolar transistor 108). Nis an integer in some implementations of the bandgap core circuit 102.

In another implementation of the bandgap core circuit 102, the bipolar transistor 108 and the bipolar transistor 110 are NPN bipolar transistors with the collectors coupled to the current source 116 and the emitters coupled to ground. Further explanation of such an implementation is provided with reference to FIG. 5.

In some implementations of the bandgap core circuit 102, the PTAT N ratio currents are scaled by the size (e.g., the emitter size of the bipolar transistors 108 and 110). For example, in the bandgap core circuit 102 illustrated in FIG. 1, the bipolar transistor 110 is N time larger than the bipolar transistor 108, and/or the PTAT current flowing through the bipolar transistor 108 is N time larger than the PTAT current flowing through the bipolar transistor 110. In some implementations of the bandgap core circuit 102, the PTAT currents are scaled by resistors (e.g., the resistors 112 and 114) coupled to the bipolar transistors 108 and 110. For example, the bipolar transistors 108 and 110 may be the same size, and the resistance of the resistor 114 may be N time greater than resistance of the resistor 112. In some implementations of the bandgap core circuit 102, the PTAT N ratio may be scaled by a combination of scaling of the bipolar transistors 108 and 110, and scaling of the resistors coupled to the bipolar transistors 108 and 110.

The error amplifier 104 compares the voltages at the collectors of the bipolar transistor 108 and the bipolar transistor 110, and generates an error signal to control the current source 116 and the current source 118. A first input (e.g., the inverting input) of the error amplifier 104 is coupled to the collector of the bipolar transistor 110. A second input (e.g., the non-inverting input) of the error amplifier 104 is coupled to the collector of the bipolar transistor 108. The output of the error amplifier 104 is coupled to a control terminal (e.g., gate) of the current source 116 and the control terminal (e.g., gate) of the current source 118. A first current terminal (e.g., source) of the current source 116 and a first current terminal (e.g., source) of the current source 118 are coupled to a power supply terminal 122. A second current terminal (e.g., drain) of the current source 116 is coupled to the emitter of the bipolar transistor 108, the emitter of the bipolar transistor 110, and the first terminal of the resistor 106. A second current terminal (e.g., drain) of the current source 118 is coupled to a first terminal of the resistor 120. A second terminal of the resistor 120 is coupled to the ground terminal 124.

While the bandgap current reference circuit 100 provide reduced circuit area, reduced resistor mismatch, and reduced amplifier offset induced $\Delta V_{BE}$ variation relative to other direct current bandgap circuits, the bandgap current reference circuit 100 has an undesirable operational mode (an undesirable operating point) where current is flowing through the resistor 106, but no current is flowing through the bipolar transistor 108 and the bipolar transistor 110. The bandgap current reference circuits of the FIGS. 2, 3, and 4 include circuitry that efficiently eliminates this undesirable operational mode.

Figure 2:
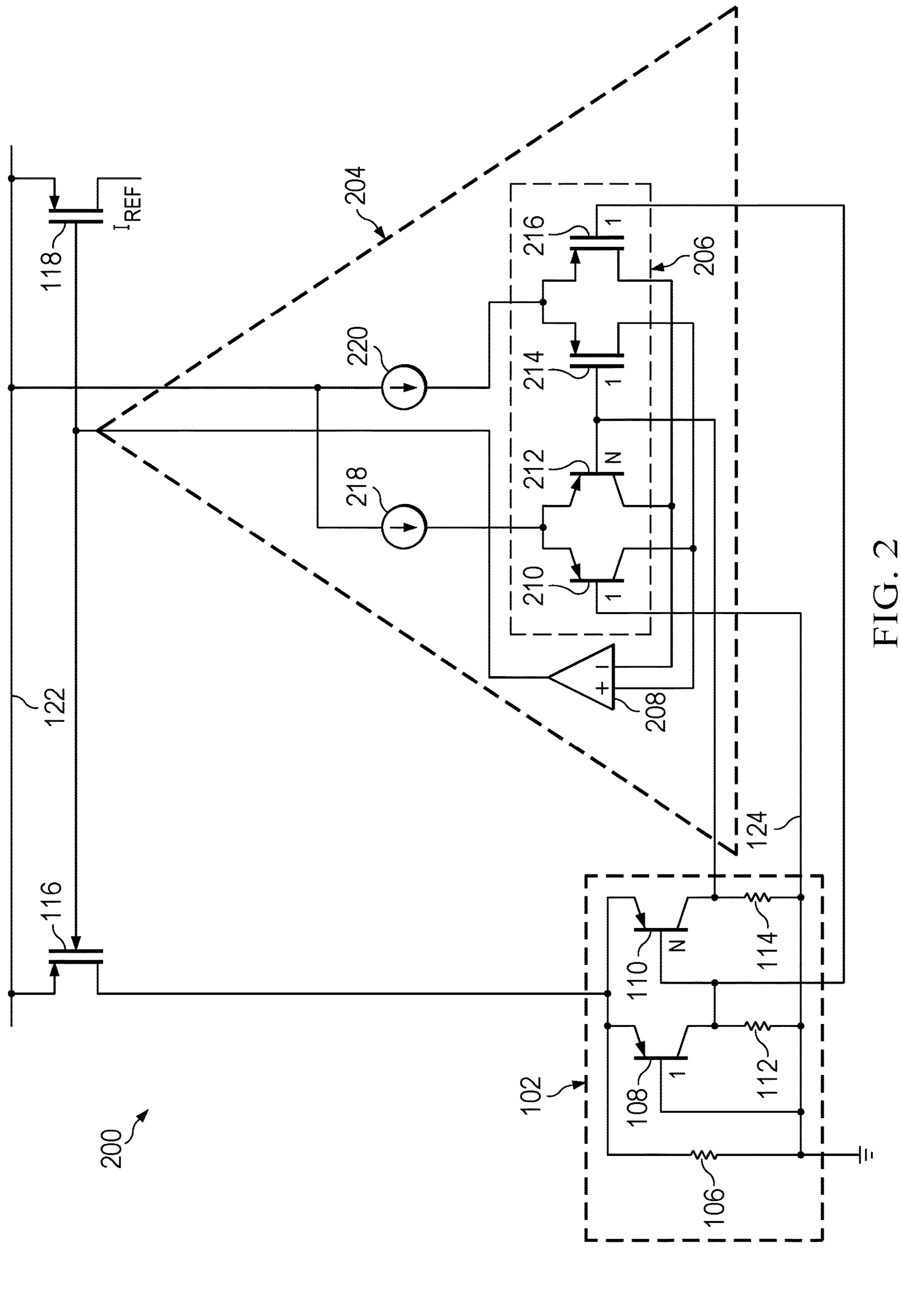
FIG. 2 is a schematic level diagram of an example bandgap current reference circuit that includes a double differential error amplifier to eliminate undesirable states of operation.

FIG. 2 is a schematic level diagram of an example bandgap current reference circuit 200 configured to eliminate undesirable operational modes. The bandgap current reference circuit 200 includes the bandgap core circuit 102 and an error amplifier 204 coupled to the bandgap core circuit 102. The error amplifier 204 includes a differential input stage 206 and a gain stage 208. The gain stage 208 is coupled to the differential input stage 206. The gain stage 208 may include a variety of amplifier circuits (e.g., a folded cascode circuit).

The differential input stage 206 is a double differential pair error amplifier that includes a bipolar transistor 210 and a bipolar transistor 212 arranged as a first differential input pair, and a transistor 214 (input transistor) and a transistor 216 (input transistor) arranged as a second differential input pair. The bipolar transistor 210 and the bipolar transistor 212 may be PNP bipolar transistors. The bipolar transistor 210 and the bipolar transistor 212 monitor current flow in the bipolar transistor 110 to ensure that the bandgap core circuit 102 is not operating in a mode where no current is flowing in the bipolar transistor 108 and the bipolar transistor 110. In contrast to implementations using a dedicated comparator that is separate from the error amplifier, the bipolar transistor 210 and the bipolar transistor 212 are integrated into the error amplifier 204 and track the desired $\Delta V_{BE}$ operating point with no systematic offset. The bipolar transistor 210 and the bipolar transistor 212 protect the bandgap core circuit 102 from undesirable operating modes at power-up of the bandgap current reference circuit 200 and during steady-state operation of the bandgap current reference circuit 200. Because the bipolar transistor 210 and the bipolar transistor 212 are active during steady-state operation, line transient immunity is improved.

An emitter of the bipolar transistor 210 is coupled to an emitter of the bipolar transistor 212, and to a current source 218. The current source 218 provides a tail current to the bipolar transistor 210 and the bipolar transistor 212. The current source 218 is coupled to the power supply terminal 122. A base of the bipolar transistor 210 is coupled to ground. A collector of the bipolar transistor 210 is coupled to an input (e.g., a non-inverting input) of the gain stage 208. A base of the bipolar transistor 212 is coupled to the collector of the bipolar transistor 110. Connection of the base of the bipolar transistor 212 to the collector of the bipolar transistor 110 provides base current compensation to the bipolar transistor 110 to improve bandgap current accuracy. A collector of the bipolar transistor 212 is coupled to an input (e.g., an inverting input) of the gain stage 208. An output of the gain stage 208 is coupled to a control input of a current source 116. An output of the current source 116 is coupled to the bandgap core circuit 102 to provide the PTAT currents flowing through the bipolar transistor 108 and the bipolar transistor 110, and the CTAT current flowing through the resistor 106.

The transistor 214 and the transistor 216 of the second differential pair may be p-channel field effect transistors (PFETs). A channel width of the transistor 214 may be about the same as a channel width of the transistor 216. The transistor 214 and the transistor 216 compare the currents flowing in the bipolar transistor 108 and the bipolar transistor 110 (detect a difference in PTAT voltages developed across the resistor 112 and the resistor 114). A source of the transistor 214 is coupled to a source of the transistor 216, and to a current source 220. The current source 220 is coupled to the power supply terminal 122. A gate of the transistor 214 is coupled to the collector of the bipolar transistor 110. A gate of the transistor 216 is coupled to the collector of the bipolar transistor 108. A drain of the transistor 214 is coupled to the collector of the bipolar transistor 210 and the first input of the gain stage 208. A drain of the transistor 216 is coupled to the collector of the bipolar transistor 212 and the second input of the gain stage 208. In some implementations of the differential input stage 206, the transistor 214 and the transistor 216 may be bipolar transistors.

Figure 3:
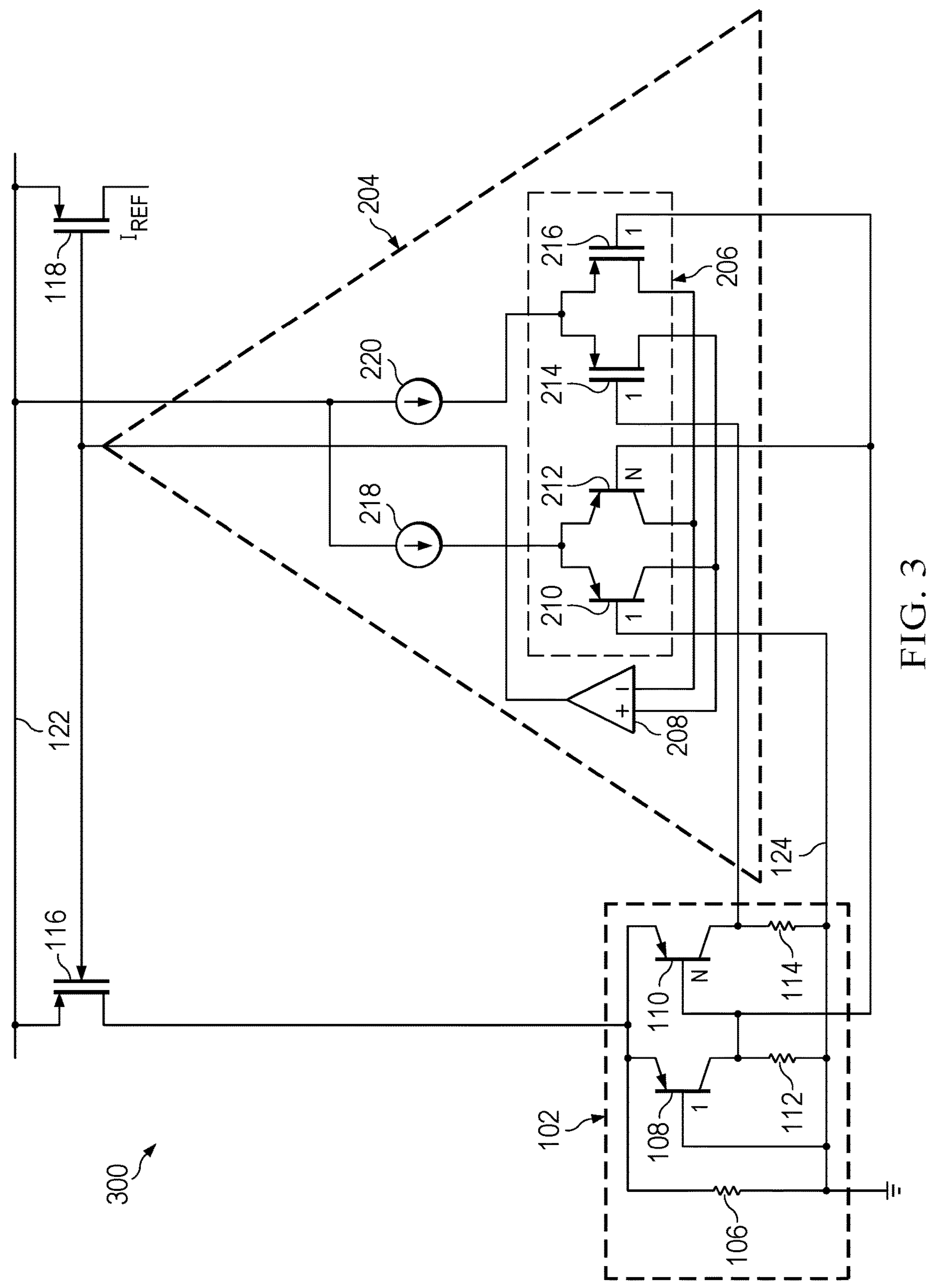
FIG. 3 is a schematic level diagram of an example bandgap current reference circuit that includes a double differential error amplifier and is suitable for use with high beta bipolar transistors.

FIG. 3 is a schematic level diagram of another example bandgap current reference circuit 300 configured to eliminate undesirable operational modes. The bandgap current reference circuit 300 includes the bandgap core circuit 102 and the error amplifier 204 coupled to the bandgap core circuit 102. Because the bandgap current reference circuit 300 includes the bandgap core circuit 102 and error amplifier 204, the bandgap current reference circuit 300 provides the compact circuitry, reduced mismatch, and protection from undesired operating modes described with respect to the bandgap current reference circuit 200. The bandgap current reference circuit 300 may provide higher loop gain/bandwidth than the bandgap current reference circuit 200, which may increase the power supply rejection of the bandgap current reference circuit 300 relative to the bandgap current reference circuit 200.

In the bandgap current reference circuit 300, the base of the bipolar transistor 212 is coupled to the collector of the bipolar transistor 108 (rather than the collector of the bipolar transistor 110 as in the bandgap current reference circuit 200). Coupling of the base of the bipolar transistor 212 to the collector of the bipolar transistor 108 makes gain of the two differential pairs of the differential input stage 206 additive, allowing the bipolar transistor 210 and the bipolar transistor 212 to increase the overall loop gain/bandwidth of the bandgap current reference circuit 300, relative to the bandgap current reference circuit 200. In the bandgap current reference circuit 300, no base current compensation is provided to the collector of the bipolar transistor 110. In the bandgap current reference circuit 300, the bipolar transistor 108 and the bipolar transistor 110 may be fabricated using a process that produces a higher beta than the process applied to fabricate the bipolar transistor 108 and the bipolar transistor 110 in the bandgap current reference circuit 200, so that no base current compensation is needed in the bandgap current reference circuit 300.

Figure 4:
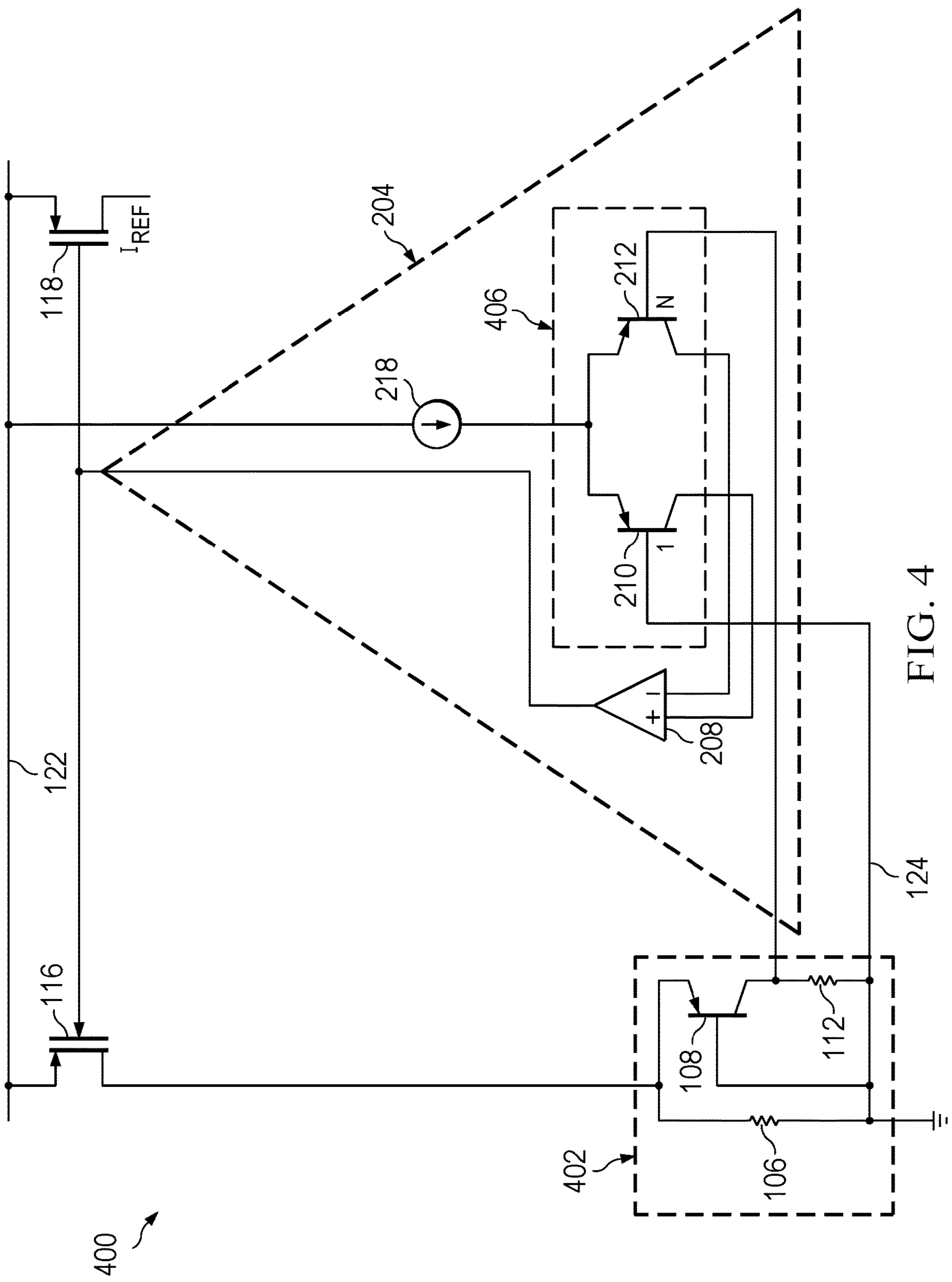
FIG. 4 is a schematic level diagram of an example bandgap current reference circuit with reduced circuit area, and with a single differential error amplifier to eliminate undesirable states of operation.

FIG. 4 is a schematic level diagram of another example bandgap current reference circuit 400 configured to eliminated undesirable operation modes. The bandgap current reference circuit 400 includes a bandgap core circuit 402 and an error amplifier 404. The bandgap core circuit 402 includes a single PTAT path to further reduce circuit area and complexity. The error amplifier 404 includes a differential input stage 406 having a single differential pair to reduce circuit area and complexity.

The bandgap core circuit 402 includes the bipolar transistor 108, the resistor 106, and the resistor 112. The bipolar transistor 110 and the resistor 114 of the bandgap core circuit 102 have been removed from the bandgap core circuit 402. Thus, the bandgap core circuit 402 provides a single CTAT leg and a single PTAT leg, rather than 2 PTAT legs as in the bandgap core circuit 102.

The differential input stage 406 includes the bipolar transistor 210 and the bipolar transistor 212. The transistor 214 and the transistor 216 of the differential input stage 206 have been omitted from the differential input stage 406. The base of the bipolar transistor 212 is coupled to the collector of the bipolar transistor 108. As in the differential input stage 206, the bipolar transistor 212 is N times larger than the bipolar transistor 210. The bipolar transistor 210 and the bipolar transistor 212 monitor the voltage across the resistor 112 (monitor the current flowing in the bipolar transistor 108) to eliminate undesirable operating modes in the bandgap core circuit 402. The bipolar transistor 212 provides base current compensation to the bipolar transistor 108.

Figure 5:
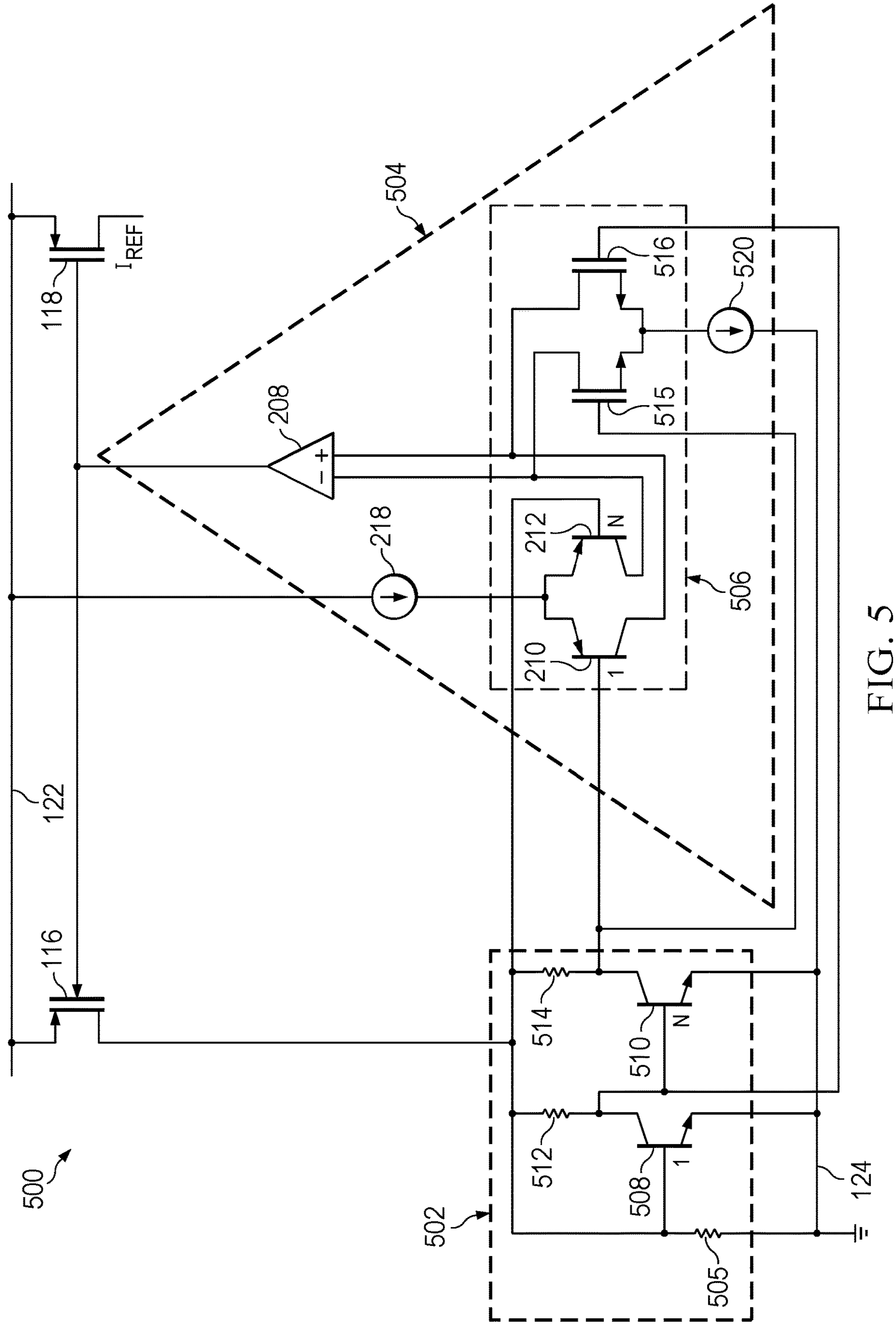
FIG. 5 is a schematic level diagram of an example bandgap current reference circuit that includes NPN bipolar transistors in the bandgap core circuit and a double differential error amplifier to eliminate undesirable states of operation.

FIG. 5 is a schematic level diagram of an example bandgap current reference circuit 500. The 500 is generally similar to the 200, but includes NPN bipolar transistors in the bandgap core circuit and N-channel FETs in the input differential pair. The bandgap current reference circuit 500 includes a bandgap core circuit 502 and an error amplifier 504 coupled to the bandgap core circuit 502. The bandgap core circuit 502 includes a bipolar transistor 508, a bipolar transistor 510, a resistor 505, a resistor 512, and a resistor 514. The bipolar transistor 508 and the bipolar transistor 510 are NPN bipolar transistors. A collector of the bipolar transistor 508 is coupled to a first terminal of the resistor 512. A second terminal of the resistor 512 is coupled to the output of the current source 116 and the base of the 508. The base of the 508 is coupled to a first terminal of the resistor 505. A second terminal of the resistor 505 is coupled to the 124. The emitter of the 508 is coupled to the 124.

A collector of the bipolar transistor 510 is coupled to a first terminal of the resistor 514. A second terminal of the resistor 514 is coupled to the output of the current source 116. The base of the 510 is coupled to the collector of the 508. The emitter of the 510 is coupled to the 124.

Current provided by the current source 116 flows through the resistor 505, the bipolar transistor 508, and the bipolar transistor 510. The current flowing through the bipolar transistor 508 and the bipolar transistor 510 is proportional to absolute temperature (PTAT), the current flowing through the resistor 505 is complementary to absolute temperature (CTAT). Thus, the bandgap core circuit 502 includes two PTAT legs and one CTAT leg, which reduces circuit area and mismatch variation relative to bandgap current reference circuits that implement multiple CTAT legs.

As explained with regard to the bandgap core circuit 102, the PTAT currents may be scaled by the size of the bipolar transistors 508 and 510, the resistance of the resistors 512 and 514, or a combination thereof.

The error amplifier 504 includes a differential input stage 506 and a gain stage 208. The gain stage 208 is coupled to the differential input stage 506. The gain stage 208 may be a folded cascode circuit or other amplifier output circuit.

The differential input stage 506 is a double differential pair error amplifier that includes the bipolar transistor 210 and the bipolar transistor 212 arranged as a first differential pair, and a transistor 515 and a transistor 516 arranged as a second differential pair. The bipolar transistor 210 and the bipolar transistor 212 may be PNP bipolar transistors. The bipolar transistor 210 and the bipolar transistor 212 monitor current flow in the bipolar transistor 510 to ensure that the bandgap core circuit 502 is not operating in a mode where no current is flowing in the bipolar transistor 508 and the bipolar transistor 510. In contrast to implementations using a dedicated comparator that is separate from the error amplifier, the bipolar transistor 210 and the bipolar transistor 212 are integrated into the error amplifier 504 and track the desired $\Delta V_{BE}$ operating point with no systematic offset. The bipolar transistor 210 and the bipolar transistor 212 protect the bandgap core circuit 502 from undesirable operating modes at power-up of the bandgap current reference circuit 500 and during steady-state operation of the bandgap current reference circuit 500. Because the bipolar transistor 210 and the bipolar transistor 212 are active during steady-state operation, line transient immunity is improved.

An emitter of the bipolar transistor 210 is coupled to an emitter of the bipolar transistor 212, and to a current source 218. The current source 218 provides a tail current to the bipolar transistor 210 and the bipolar transistor 212. The current source 218 is coupled to the power supply terminal 122. A base of the bipolar transistor 210 is coupled to the collector of the 510 and the first terminal of the resistor 514. A collector of the bipolar transistor 210 is coupled to an input (e.g., a non-inverting input) of the gain stage 208. A base of the bipolar transistor 212 is coupled to the second terminal of the resistor 514. A collector of the bipolar transistor 212 is coupled to an input (e.g., an inverting input) of the gain stage 208. An output of the gain stage 208 is coupled to a control input of a current source 116. An output of the current source 116 is coupled to the bandgap core circuit 502 to provide the PTAT currents flowing through the bipolar transistor 508 and the bipolar transistor 510, and the CTAT current flowing through the resistor 505.

The transistor 515 and the transistor 516 of the second differential pair may be NFETs. A channel width of the transistor 515 may be about the same as a channel width of the transistor 516. The transistor 515 and the transistor 516 compare the currents flowing in the bipolar transistor 508 and the bipolar transistor 510. A source of the transistor 515 is coupled to a source of the transistor 516, and to a current source 520. The current source 520 is coupled to the 124. A gate of the transistor 515 is coupled to the collector of the bipolar transistor 510. Agate of the transistor 516 is coupled to the collector of the bipolar transistor 508. A drain of the transistor 515 is coupled to the collector of the bipolar transistor 212 and the first input of the gain stage 208. A drain of the transistor 516 is coupled to the collector of the bipolar transistor 210 and the second input of the gain stage 208.

Figure 6:
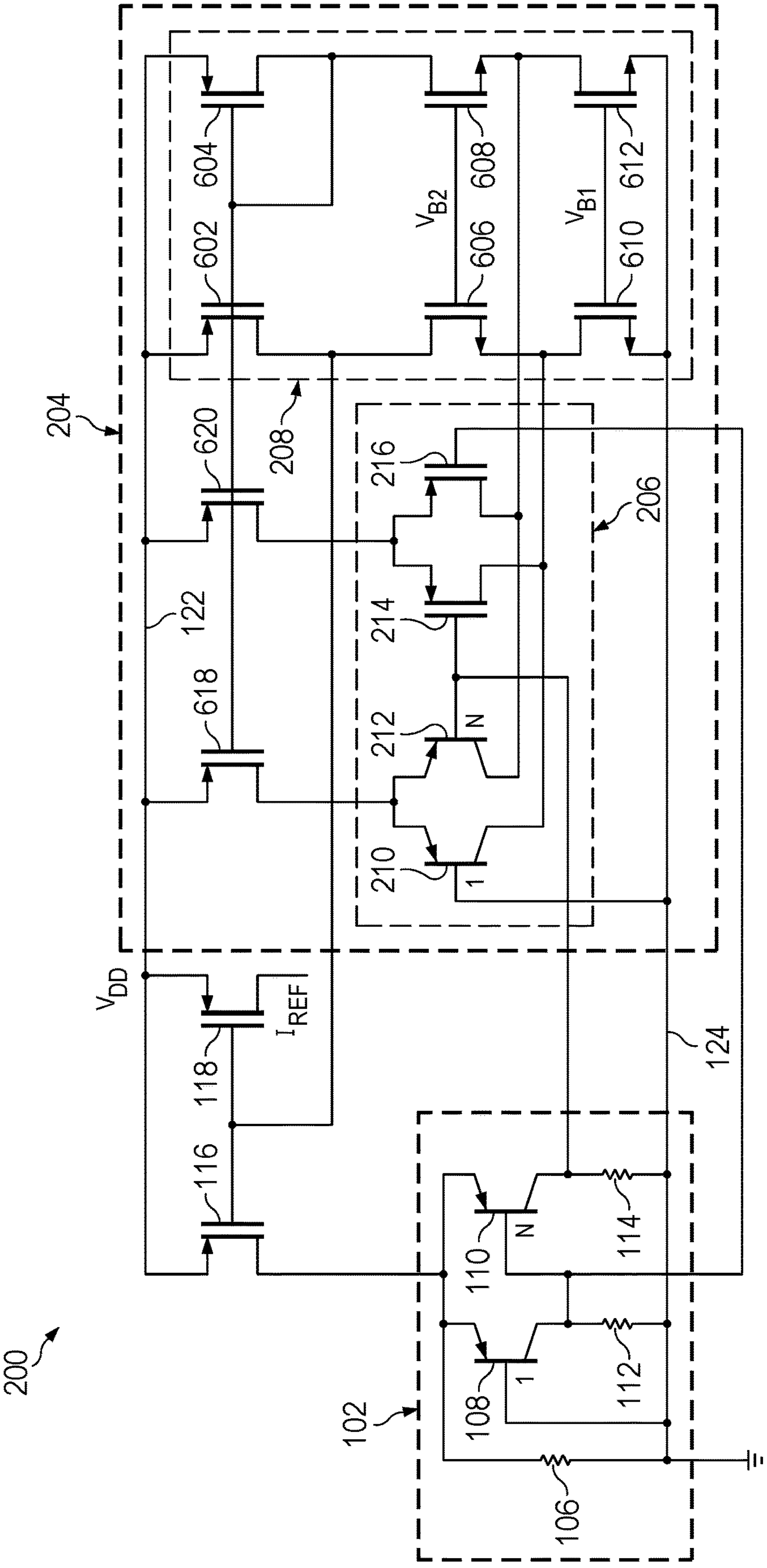
FIG. 6 is a schematic level diagram representing an example of the bandgap current reference circuit of FIG. 2.

FIG. 6 is a schematic level diagram representing an example of the bandgap current reference circuit 200. FIG. 6 shows various components (the bandgap core circuit 102, the differential input stage 206, etc.) of the bandgap current reference circuit 200 as illustrated in FIG. 2. FIG. 6 shows an example of the gain stage 208, as including transistors 602, 604, 606, 608, 610, and 612. Other examples of the gain stage 208 may include different and/or additional circuitry. The transistor 602 and the transistor 604 are arranged as current mirror, with the transistor 604 diode-connected. The transistor 618 (corresponding to the current source 218) and the transistor 620 (corresponding to the current source 220) mirror the current flowing through the transistor 604 to the differential input stage 206. Current flowing through the transistor 604 flows through the transistor 608 and the transistor 612. A mirror current flowing through the transistor 602 flows through the transistor 606 and the transistor 610. The drain of the transistor 214 is coupled to the source of the transistor 606. The drain of the transistor 216 is coupled to the source of the transistor 608. The gates of the transistor 606 and the transistor 608 are coupled to a bias voltage source (not shown) that generates a bias voltage $V_{B2}$. The gates of the transistor 610 and the transistor 612 are coupled to a bias voltage source (not shown) that generates a bias voltage $V_{B1}$. Current flow in the gain stage 208 is modulated by the bias voltage $V_{B1}$ and the output of the differential input stage 206. The drain of the transistor 606 is coupled to the control terminal of the current source 116 and the control terminal of the current source 118 to set the reference current ($I_{REF}$).

Figure 7:
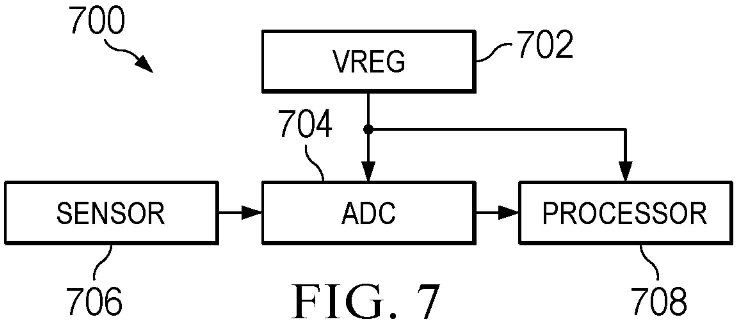
FIG. 7 is a block diagram of an example data acquisition system that includes a voltage regulator incorporating a bandgap current reference circuit as shown in FIG. 1, 2, 3, or 4.

FIG. 7 is a block diagram of an example data acquisition system 700. The data acquisition system 700 includes a voltage regulator 702, an analog-to-digital converter (ADC) 704, a sensor 706, and a processor 708. The voltage regulator 702 includes the bandgap current reference circuit 100, the bandgap current reference circuit 200, the bandgap current reference circuit 300, or the bandgap current reference circuit 400. The voltage regulator 702 generates a regulated voltage for use by the ADC 704 and the processor 708.

The ADC 704 is coupled to the voltage regulator 702 for receipt of the regulated voltage generated by the voltage regulator 702. The ADC 704 applies the reference voltage to digitize a measurement signal received from the sensor 706. The sensor 706 is coupled to the ADC 704, and provides a measurement signal to the ADC 704. The sensor 706 may be, for example, a temperature sensor, a humidity sensor, a voltage sensor, a current sensor, a flow sensor, or any other sensor that produces a measurement signal. The ADC 704 may be configured to implement any of a variety of digitization techniques to convert the measurement signal to a digital value. For example, the ADC 704 may be a successive approximation register ADC, a delta-sigma ADC, a dual slope, ADC, a pipelined ADC, a FLASH ADC, or other type of ADC.

The ADC 704 is coupled to the processor 708. The ADC 704 provides digitized values of the measurement signal to the processor 708 for processing. The processor 708 is coupled to the voltage regulator 702 for receipt of the regulated voltage generated by the voltage regulator 702. The processor 708 may be a microcontroller, a general-purpose microprocessor, a digital signal processor, or other digital circuit configured to process digital measurement values generated by the ADC 704.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead. For example, a p-channel field effect transistor ("PFET") may be used in place of an n-channel field effect transistor ("NFET") with little or no changes to the circuit. Furthermore, other types of transistors may be used (such as NPN or PNP bipolar junction transistors (BJTs)).

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter.

Modifications are possible in the described embodiments, and other embodiments are possible, within the scope of the claims.

What is claimed is:

1. A circuit, comprising:

a current source having a control input and an output;

a bandgap circuit coupled to the output of the current source; and an error amplifier circuit having a first input and a second input coupled to the bandgap circuit and output coupled to the control input of the current source, the error amplifier circuit including:

a gain stage circuit having an output coupled to the output of the error amplifier circuit, and first and second inputs; and an input stage circuit having a first output and a second output coupled to, respectively, the first input and the second input of the gain stage circuit, the input stage circuit including:

a first transistor including a control terminal coupled to a first input of the error amplifier circuit, a first terminal coupled to the first output, and a second terminal; and a second transistor including a control terminal coupled to a second input of the error amplifier circuit, a first terminal coupled to the second output, and a second terminal, wherein the second terminal of the second transistor is coupled to the second terminal of the first transistor, wherein the first transistor and the second transistor are bipolar transistors, and wherein a current through the second terminal of the second transistor is larger than a current through the second terminal of the first transistor.

2. The circuit of claim 1, wherein the bandgap circuit includes:

a third transistor having a control terminal, a first terminal, and a second terminal, the control terminal of the third transistor coupled to the first input of the error amplifier circuit, the first terminal of the third transistor coupled to the output of the current source or a reference terminal, and the second terminal of the third transistor coupled to the second input of the error amplifier circuit; and a resistor coupled between the control terminal and the second terminal of the third transistor.

3. The circuit of claim 2, wherein the resistor is a first resistor, and bandgap circuit includes:

a fourth transistor having a control terminal, a first terminal, and a second terminal, the control terminal of the fourth transistor coupled to the second terminal of the third transistor, the first terminal of the fourth transistor coupled to the output of the current source or the reference terminal, and the second terminal of the fourth transistor coupled to the second input of the error amplifier circuit; and a second resistor coupled between the second terminal of the fourth transistor and the first input of the error amplifier circuit.

4. The circuit of claim 1, wherein:

the second terminal of the first transistor is a first emitter and the second terminal of the second transistor is a second emitter; and the second emitter is larger than the first emitter.

5. The circuit of claim 1, wherein error amplifier circuit has a third input coupled to the bandgap circuit, and the input stage circuit includes:

a third transistor having a control terminal, a first terminal, and a second terminal, wherein the control terminal of the third transistor is coupled to the second input of the error amplifier circuit; and a fourth transistor having a control terminal, a first terminal, and a second terminal, wherein the second terminal of the third transistor is coupled to the second terminal of the fourth transistor, and the control terminal of the fourth transistor is coupled to the third input of the error amplifier circuit, the third and fourth transistors being field effect transistors.

6. The circuit of claim 5, wherein:

the bandgap circuit includes:

a fifth transistor having a control terminal, a first terminal, and a second terminal, the control terminal of the fifth transistor coupled to the first input of the error amplifier circuit, the first terminal of the fifth transistor coupled to the output of the current source or a reference terminal, and the second terminal of the fifth transistor coupled to the third input of the error amplifier circuit; and a first resistor coupled between the control terminal and the second terminal of the fifth transistor;

a sixth transistor having a control terminal, a first terminal, and a second terminal, the control terminal of the sixth transistor coupled to the second terminal of the fifth transistor and the third input of the error amplifier circuit, the first terminal of the sixth transistor coupled to the output of the current source or the reference terminal, and the second terminal of the sixth transistor coupled to the second input of the error amplifier circuit; and a second resistor coupled between the second terminal of the sixth transistor and the first input of the error amplifier circuit;

the second terminal of the third transistor coupled to the first input of gain stage circuit, and the second terminal of the fourth transistor coupled to the second input of the gain stage circuit.

7. The circuit of claim 5, wherein:

the bandgap circuit includes:

a fifth transistor having a control terminal, a first terminal, and a second terminal, the control terminal of the fifth transistor coupled to the first input of the error amplifier circuit, the first terminal of the fifth transistor coupled to the output of the current source or a reference terminal, and the second terminal of the fifth transistor coupled to the second input of the error amplifier circuit; and a first resistor coupled between the control terminal and the second terminal of the fifth transistor;

a sixth transistor having a control terminal, a first terminal, and a second terminal, the control terminal of the sixth transistor coupled to the second terminal of the fifth transistor and the third input of the error amplifier circuit, the first terminal of the sixth transistor coupled to the output of the current source or the reference terminal, and the second terminal of the sixth transistor coupled to the third input of the error amplifier circuit; and a second resistor coupled between the second terminal of the sixth transistor and the first input of the error amplifier circuit;

the second terminal of the third transistor coupled to the second input of gain stage circuit, and the second terminal of the fourth transistor coupled to the first input of the gain stage circuit.

8. The circuit of claim 1, wherein the first and second transistors are PNP bipolar transistors.

9. The circuit of claim 5, wherein the third and fourth transistors are p-type field effect transistors.

10. The circuit of claim 5, wherein the third and fourth transistors are n-type field effect transistors.

11. The circuit of claim 2, wherein the third transistor is a PNP bipolar transistor.

12. The circuit of claim 2, wherein the third transistor is an NPN bipolar transistor.

13. The circuit of claim 5, wherein the bandgap circuit includes one or more PNP bipolar transistors.

14. The circuit of claim 5, wherein the bandgap circuit includes one or more NPN bipolar transistors.

15. A circuit comprising:

a bandgap circuit including a first bipolar transistor; and an error amplifier circuit coupled to the bandgap circuit, the error amplifier circuit including:

a gain stage circuit; and a differential input stage circuit coupled to the gain stage circuit, the differential input stage circuit including:

a first transistor including a control terminal, a first terminal, and a second terminal;

a second transistor including a control terminal, a first terminal, and a second terminal, wherein the second terminal of the second transistor is coupled to the second terminal of the first transistor wherein the first transistor and the second transistor are bipolar transistors;

a third transistor including a control terminal, a first terminal, and a second terminal, wherein the control terminal of the third transistor is coupled to the control terminal of the second transistor, and the first terminal of the third transistor is coupled to the first terminal of the first transistor; and a fourth transistor including a control terminal, a first terminal, and a second terminal, wherein the second terminal of the third transistor is coupled to the second terminal of the fourth transistor, the control terminal of the fourth transistor is coupled to the bandgap circuit, and the first terminal of the fourth transistor is coupled to the first terminal of the second transistor, wherein the third and fourth transistors are field effect transistors.

16. The circuit of claim 15, wherein:

the bandgap circuit includes:

a fifth transistor including a control terminal, a first terminal, and a second terminal;

a sixth transistor including a control terminal, a first terminal, and a second terminal, wherein the control terminal of the sixth transistor is coupled to the first terminal of the fifth transistor;

the sixth transistor is the first bipolar transistor;

a first resistor coupled between the second terminal of the fifth transistor and a ground terminal;

a second resistor coupled between the first terminal of the fifth transistor and the ground terminal; and a third resistor coupled between the first terminal of the sixth transistor and the ground terminal.

17. The circuit of claim 16, wherein:

the control terminal of the second transistor and the control terminal of the third transistor are coupled to the first terminal of the sixth transistor;

the control terminal of the first transistor is coupled to the ground terminal; and the control terminal of the fourth transistor is coupled to the control terminal of the second transistor.

18. The circuit of claim 15, wherein:

the second terminal of the first transistor is a first emitter and the second terminal of the second transistor is a second emitter; and the second emitter is larger than the first emitter.

19. The circuit of claim 15, wherein:

the error amplifier circuit includes the gain stage circuit including a first input terminal and a second input terminal;

the first terminal of the first transistor and the first terminal of the third transistor are coupled to a first input terminal of the gain stage circuit; and the first terminal of the second transistor and the first terminal of the fourth transistor are coupled to a second input terminal of the gain stage circuit.

20. The circuit of claim 19, wherein:

the gain stage circuit includes:

a seventh transistor including a control terminal, a first terminal, and a second terminal;

an eighth transistor including a control terminal, a first terminal coupled to the first terminal of the seventh transistor, and a second terminal;

a ninth transistor including a control terminal, a first terminal coupled to the second terminal of the eighth transistor and the first input terminal of the gain stage circuit, and a second terminal coupled to a ground terminal;

a tenth transistor including a control terminal coupled to the control terminal of the seventh transistor, a first terminal coupled to the control terminal of the tenth transistor, and a second terminal coupled to the second terminal of the seventh transistor;

an eleventh transistor including a control terminal coupled to the control terminal of the eighth transistor, a first terminal coupled to the first terminal of the tenth transistor, and a second terminal coupled to the second input terminal of the gain stage circuit; and a twelfth transistor including a control terminal coupled to the control terminal of the ninth transistor, a first terminal coupled to the second terminal of the eleventh transistor and the second input terminal of the gain stage circuit, and a second terminal coupled to the second terminal of the ninth transistor and to the ground terminal.

21. The circuit of claim 15, wherein:

the error amplifier circuit includes a first current source coupled to the second terminal of the first transistor and the second terminal of the second transistor; and the error amplifier circuit includes a second current source coupled to the second terminal of the third transistor and the second terminal of the fourth transistor.

22. A data acquisition system, comprising:

a processor;

a voltage regulator coupled to the processor, the voltage regulator including:

a bandgap circuit; and an error amplifier circuit coupled to the bandgap circuit, the error amplifier circuit including:

a first differential input pair of bipolar transistors configured to be active during steady-state operation of the bandgap circuit wherein the first differential input pair of bipolar transistors includes a first transistor including a first terminal, a second terminal, and a control terminal, and a second transistor including a first terminal, a second terminal, and a control terminal, and wherein the second terminal of the second transistor is coupled to the second terminal of the first transistor; and a second differential input pair of field effect transistors, wherein the second differential input pair of field effect transistors includes a third transistor including a first terminal, a second terminal, and control terminal, and a fourth transistor including a first terminal, a second terminal, and a control terminal, wherein the second terminal of the third transistor is coupled to the second terminal of the fourth transistor, the control terminal of the fourth transistor is coupled to the bandgap circuit, the first terminal of the fourth transistor is coupled to the first terminal of the second transistor.

23. The data acquisition system of claim 22, wherein:

the bandgap circuit is configured to generate a zero-temperature coefficient bandgap current; and the bandgap circuit includes a bipolar transistor configured to pass a current that is proportional to absolute temperature (a PTAT current).

* * * * *